(12) United States Patent
Monti

(10) Patent No.: US 11,198,564 B2
(45) Date of Patent: Dec. 14, 2021

(54) TRANSPORT SYSTEM FOR TRANSPORT OF PRODUCTS

(71) Applicant: MARCHESINI GROUP S.p.A., Pianoro (IT)

(72) Inventor: Giuseppe Monti, Pianoro (IT)

(73) Assignee: MARCHESINI GROUP S.P.A., Pianoro (IT)

( * ) Notice: Subject to any disclaimer, the term of this patent is extended or adjusted under 35 U.S.C. 154(b) by 0 days.

(21) Appl. No.: 17/254,607

(22) PCT Filed: Jul. 15, 2019

(86) PCT No.: PCT/IB2019/056021
§ 371 (c)(1),
(2) Date: Dec. 21, 2020

(87) PCT Pub. No.: WO2020/016746
PCT Pub. Date: Jan. 23, 2020

(65) Prior Publication Data
US 2021/0139249 A1 May 13, 2021

(30) Foreign Application Priority Data

Jul. 20, 2018 (IT) .................. 102018000007365

(51) Int. Cl.
| | | |
|---|---|---|
| B65G 21/22 | (2006.01) |
| B65G 39/18 | (2006.01) |
| F16C 13/00 | (2006.01) |
| F16C 29/00 | (2006.01) |
| B65G 54/02 | (2006.01) |

(52) U.S. Cl.
CPC ............ *B65G 39/18* (2013.01); *F16C 13/006* (2013.01); *F16C 29/005* (2013.01); *B65G 54/02* (2013.01); *F16C 2326/00* (2013.01)

(58) Field of Classification Search
CPC ........ B65G 9/002; B65G 21/22; B65G 39/18; B65G 39/20; B65G 35/06
USPC .......................... 198/465.2, 465.3, 465.4, 779
See application file for complete search history.

(56) References Cited

U.S. PATENT DOCUMENTS

| | | | | |
|---|---|---|---|---|
| 4,113,328 A | * | 9/1978 | Vander Meulen ..... | B65G 39/09 384/482 |
| 4,867,579 A | * | 9/1989 | Galione ................ | F16C 29/045 384/53 |
| 5,211,279 A | * | 5/1993 | Abbestam ............. | B23Q 1/262 198/750.1 |

(Continued)

FOREIGN PATENT DOCUMENTS

| | | |
|---|---|---|
| JP | H05 278608 A | 10/1993 |
| WO | WO 2018/060882 A1 | 4/2018 |

*Primary Examiner* — Joseph A Dillon, Jr.
(74) *Attorney, Agent, or Firm* — R. Neil Sudol; Henry D. Coleman

(57) ABSTRACT

A transport system has a mobile carriage for transport of products along a guide path that has a first guide profile and a second guide profile. A first pair of rollers is mounted rotatably on a first rotation shaft borne by the carriage, so as to engage the first guide profile. A second pair of rollers rotatably mounted on the second rotation shaft engages the second guide profile. For each roller of the first pair of rollers and for each roller of the second pair of rollers, a reinforcing element is provided which is friction-coupled to at least a part of the main portions of external lateral walls of the rollers.

12 Claims, 5 Drawing Sheets

(56) References Cited

U.S. PATENT DOCUMENTS

| | | | | |
|---|---|---|---|---|
| 5,632,589 | A * | 5/1997 | Bray | B61B 13/04 198/349.6 |
| 6,758,325 | B2 * | 7/2004 | Greeley | B61B 3/00 198/465.4 |
| 8,872,460 | B2 * | 10/2014 | Cooper | H02P 5/74 318/490 |
| 9,008,831 | B1 * | 4/2015 | Jacobs | B65G 43/08 700/217 |
| 9,300,144 | B2 * | 3/2016 | Cooper | H02H 7/1227 |
| 9,446,902 | B2 * | 9/2016 | Aumann | B65G 54/02 |
| 9,604,795 | B2 * | 3/2017 | Aumann | B65G 54/02 |
| 9,850,071 | B2 * | 12/2017 | Fenile | B65G 19/025 |
| 10,106,339 | B2 * | 10/2018 | Prussmeier | H02K 16/04 |
| 10,164,555 | B1 * | 12/2018 | Ozimek | H02P 25/064 |
| 10,351,350 | B2 * | 7/2019 | Nara | F16C 29/045 |
| 10,399,779 | B2 * | 9/2019 | Fenile | B65G 39/12 |
| 10,414,596 | B2 * | 9/2019 | Monti | B65G 54/02 |
| 10,587,212 | B1 * | 3/2020 | Van Dorpe | H02K 41/031 |
| 11,091,322 | B2 * | 8/2021 | Monti | B65G 39/12 |
| 2003/0103697 | A1 | 6/2003 | Mochizuki | B65G 9/002 384/44 |
| 2003/0150696 | A1 | 8/2003 | Walter | B65G 19/025 198/465.4 |
| 2003/0230941 | A1 * | 12/2003 | Jacobs | B29C 66/1122 310/12.19 |
| 2007/0041819 | A1 * | 2/2007 | Komatsu | B65G 35/06 414/564 |
| 2010/0314223 | A1 * | 12/2010 | Franz | B65G 17/20 198/802 |
| 2013/0119913 | A1 * | 5/2013 | Cooper | H02H 7/1227 318/490 |
| 2014/0331888 | A1 * | 11/2014 | Wernersbach | A63G 21/04 104/282 |
| 2015/0027338 | A1 * | 1/2015 | Aumann | B60L 13/03 104/290 |
| 2015/0042162 | A1 * | 2/2015 | Cooper | H02P 5/74 307/12 |
| 2015/0144462 | A1 * | 5/2015 | Weiss | B65G 54/02 198/619 |
| 2016/0031648 | A1 * | 2/2016 | Prussmeier | B65G 54/02 104/107 |
| 2016/0046444 | A1 * | 2/2016 | Fenile | B65G 39/18 198/687.1 |
| 2016/0046445 | A1 * | 2/2016 | Studer | B65G 17/385 198/838 |
| 2016/0176658 | A1 * | 6/2016 | Aumann | B65G 54/02 198/803.11 |
| 2016/0176659 | A1 * | 6/2016 | Aumann | B65G 54/02 198/619 |
| 2016/0229645 | A1 * | 8/2016 | Von Ehrenstein | B65G 54/02 |
| 2017/0217686 | A1 * | 8/2017 | Lakhotia | B65G 21/22 |
| 2017/0225693 | A1 * | 8/2017 | Fenile | B61B 3/00 |
| 2018/0305045 | A1 * | 10/2018 | Monti | B65B 57/20 |
| 2019/0009990 | A1 * | 1/2019 | Nara | B65G 35/06 |
| 2019/0047799 | A1 * | 2/2019 | Spotti | B65G 37/02 |
| 2019/0218038 | A1 * | 7/2019 | Monti | B65G 17/20 |
| 2019/0367284 | A1 * | 12/2019 | Papsdorf | B65G 23/08 |
| 2020/0048006 | A1 * | 2/2020 | Neufeld | B65G 17/32 |
| 2021/0039892 | A1 * | 2/2021 | Monti | B65G 39/02 |
| 2021/0213469 | A1 * | 7/2021 | Neufeld | B65G 54/02 |

* cited by examiner

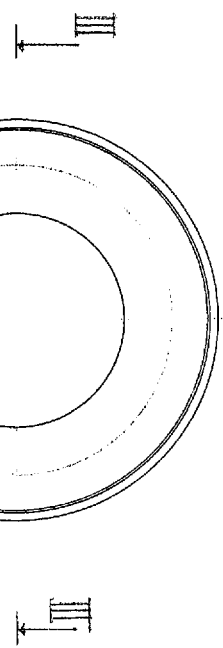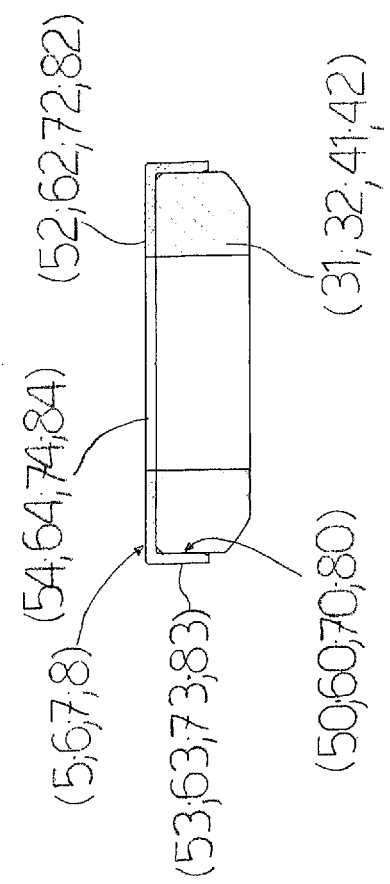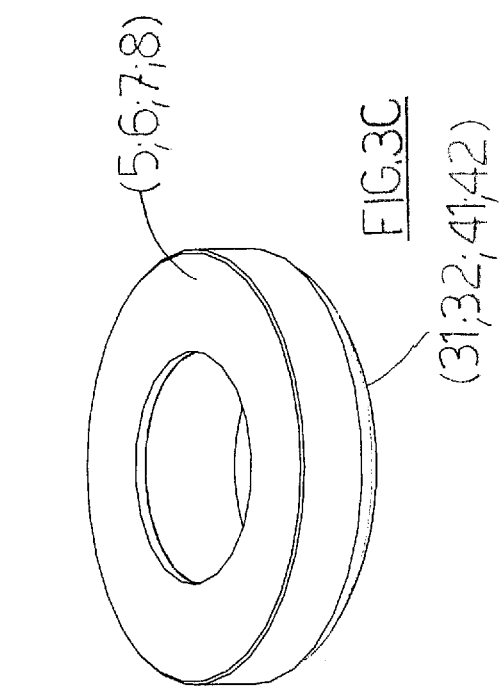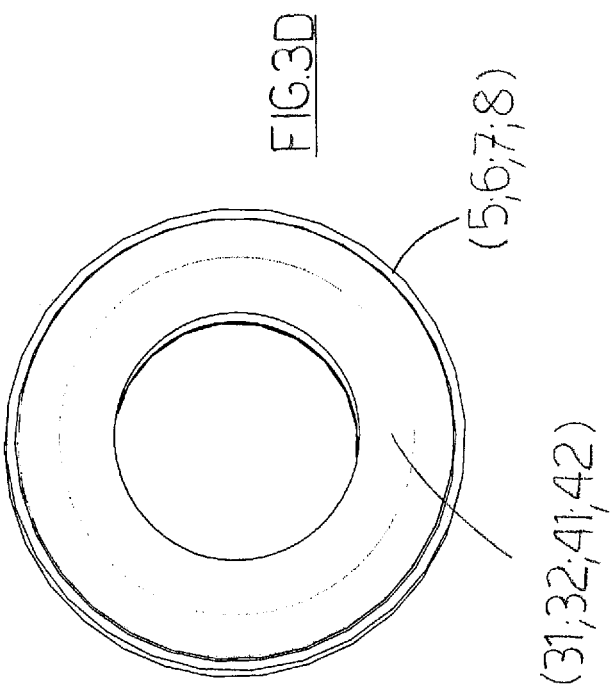

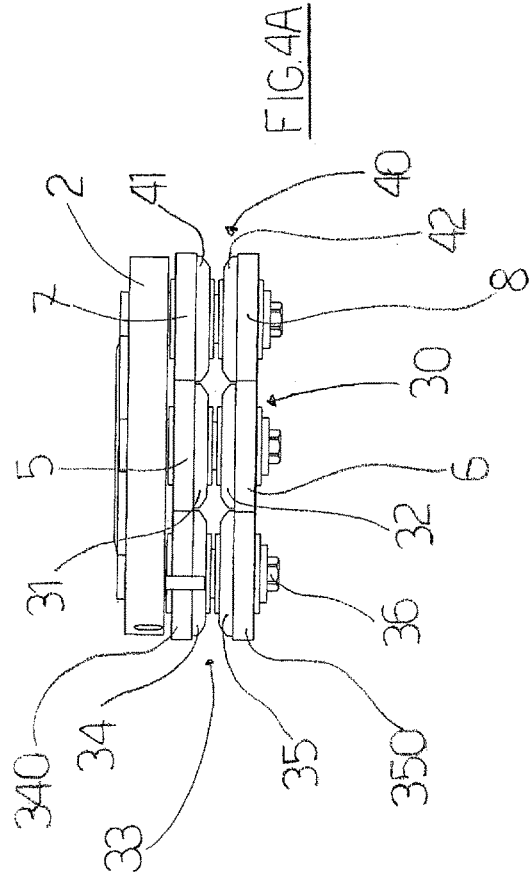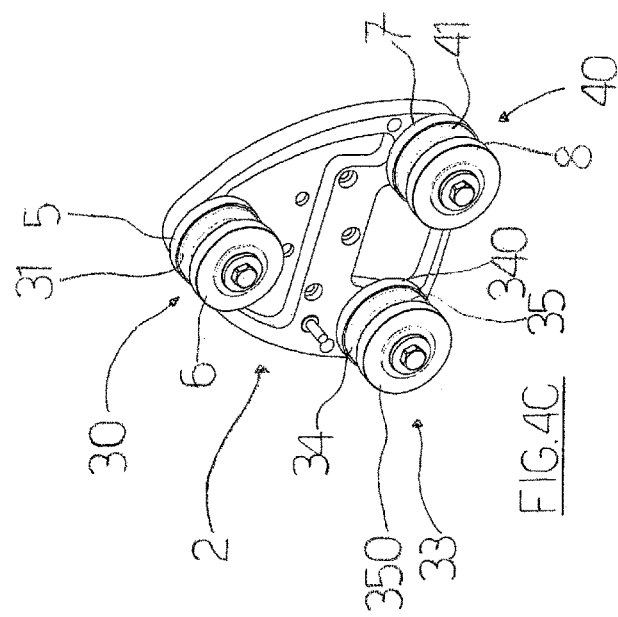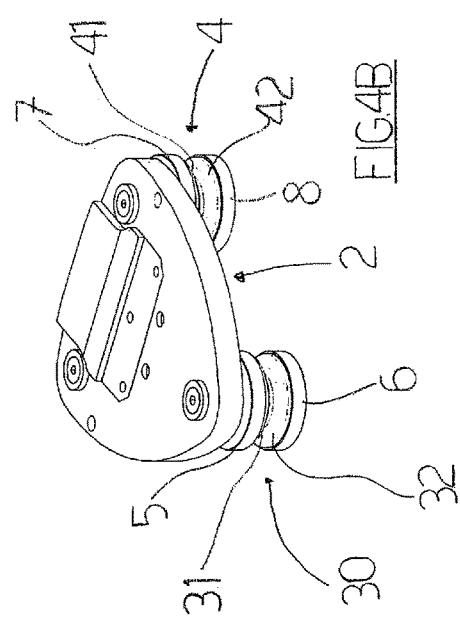

TRANSPORT SYSTEM FOR TRANSPORT OF PRODUCTS

FIELD OF THE INVENTION

The present invention relates to a transport system for transport of products.

In the sector of automatic work machines, there is a known need to transport products, objects, articles, components etc. along a predefined pathway so as to be able to know, exactly and precisely, the position and orientation thereof in relation to specific working steps which are to be carried out.

DESCRIPTION OF THE PRIOR ART

A type of transport system at present used for transport of products comprises at least a mobile carriage, for transport of at least a relative product, and a guide path along which the mobile carriage is moved, by relative actuator means, such as for example linear motors or conveyor belts, or other systems, for example of movement by magnetic coupling.

These transport systems are made in such a way that the guide path, along which the mobile carriage is to be moved, is structured and configured in such a way as to have a first guide profile and a second guide profile which, for example, extend parallel to one another and which have straight portions and curved portions.

The guide path is structured and configured so that the first guide profile and the second guide profile identify a looped guide path for the movement of the carriage, thus comprising a succession of straight portions connected by curved portions.

The first guide profile is conformed in such a way as to have a first rolling wall and a second rolling wall, for example arranged inclined to one another, and likewise the second guide profile is in turn conformed so as to have a first rolling wall and a second rolling wall, for example arranged inclined to one another.

The mobile carriage, in order to be guided and moved along a guide path, therefore along the first guide profile and the second guide profile, comprises rolling elements that must be predisposed in such a way as to be in contact with and to be able to roll on the two rolling walls of each of the two guide profiles.

At present, in these transport systems having a guide path of this sort, the mobile carriages are conceived and structured in such a way that the rolling elements comprise at least a first pair of rollers, which are mounted rotatably, by bearings, on a first rotation shaft mounted on the carriage in such a way as to be coupled to the first guide profile, and at least a second pair of rollers which are mounted rotatably, by means of bearings, on a second rotation shaft mounted on the carriage, so as to be coupled to the second guide profile.

In particular, the rollers of the at least a first pair of rollers have a shape that is such as to have a lateral surface having a main portion and a contact portion and are mounted on the first rotation shaft so that a first roller is in contact via the relative contact portion with the first rolling wall of the first guide profile and so that a second roller is in contact, via the relative contact portion, with the second rolling wall of the first guide profile.

In turn, the rollers of the at least a second pair of rollers have a shape that is such as to have a lateral surface having a main portion and a contact portion and are mounted on the second rotation shaft so that a first roller is in contact via the relative contact portion with the first rolling wall of the first guide profile and so that a second roller is in contact, via the relative contact portion, with the second rolling wall of the second guide profile.

Usually both the rollers of the first pair of rollers, and the rollers of the second pair of rollers are made of a plastic material.

Special projecting support elements are predisposed on the mobile carriage, to which the products to be transported are coupled.

The Applicant has found that these transport systems have certain drawbacks.

The carriages can be moved along the guide path for even long working times, and/or also at a speed or with significant accelerations/decelerations: this can lead to an overheating of the rollers due to the rolling thereof along the guide profiles.

Any overheating of the rollers can lead to a dilation or variation of shape of the plastic material with which they are realised.

The onset of these circumstances can produce negative repercussions on the coupling and blocking of the rollers on the bearings and thus on the relative rotation shafts.

The Applicant has found that, in the case of overheating of the rollers and therefore a dilation of the plastic material with which they are realised, the blocking of the rollers on the bearings can loosen, with the onset of possibly undesired radial and/or axial play, and thus negative repercussions on the rotational effectiveness with respect to the rotation shaft and the rolling efficiency thereof along the guide profiles.

The loosening of the block of the rollers, and therefore the onset of any undesired radial and/or axial play can result, also due to the stresses to which they are subjected.

In fact, the products to be transferred can be of any type and therefore also have a not-insignificant weight.

Consequently, the forces and moments that act on the rollers can also be of a significant entity, so as to compromise the effectiveness of the blocking thereof on the bearings, and therefore on the relative rotation shafts.

SUMMARY OF THE INVENTION

The aim of the present invention is therefore to provide a new transport system for transporting products that is able to obviate the above-mentioned drawbacks present in the transport systems of known type.

In particular, an aim of the present invention is to propose a new transport system in which the correct coupling of the rollers is always guaranteed with respect to the relative rotation shafts, preventing the onset of any undesired radial and/or axial play.

The above-cited aims are attained with a transport system according to the contents of claim 1.

BRIEF DESCRIPTION OF THE DRAWINGS

Other advantageous characteristics of the transport system according to the invention are set out in the various dependent claims.

The characteristics of a preferred, but not exclusive, embodiment of the transport system of the present invention will be described in the following with reference to the appended tables of drawings, in which:

FIG. 3A illustrates, in a plan view, the particular elements and characteristics of the transport system of the present invention;

FIG. 3B is a view along section plane III-III of FIG. 3A;

FIGS. 3C and 3D illustrate, according to respective perspective views from different angles, the elements of FIG. 3A;

FIG. 4A illustrates a front view of the a possible preferred embodiment of the mobile carriage of the transport system of the present invention, on which the characteristic elements of FIG. 3A are mounted;

FIGS. 4B and 4C illustrate, according to respective perspective views from different angles, the mobile carriage of FIG. 4A.

DESCRIPTION OF THE PREFERRED EMBODIMENTS

With reference to the accompanying tables of drawings, reference letter (S) denotes the transport system for transporting products of the present invention in its entirety.

The transport system comprises a guide path (1) and at least a mobile carriage (2) for transport of products movable along the guide path (1).

For example, in preferred ways (not illustrated nor described in detail as not part of the invention) the mobile carriage (2) can be movable along the guide path (1) by use of activating belts or other actuating organs such as linear motors and the like, or by magnetic coupling.

Figure 1:
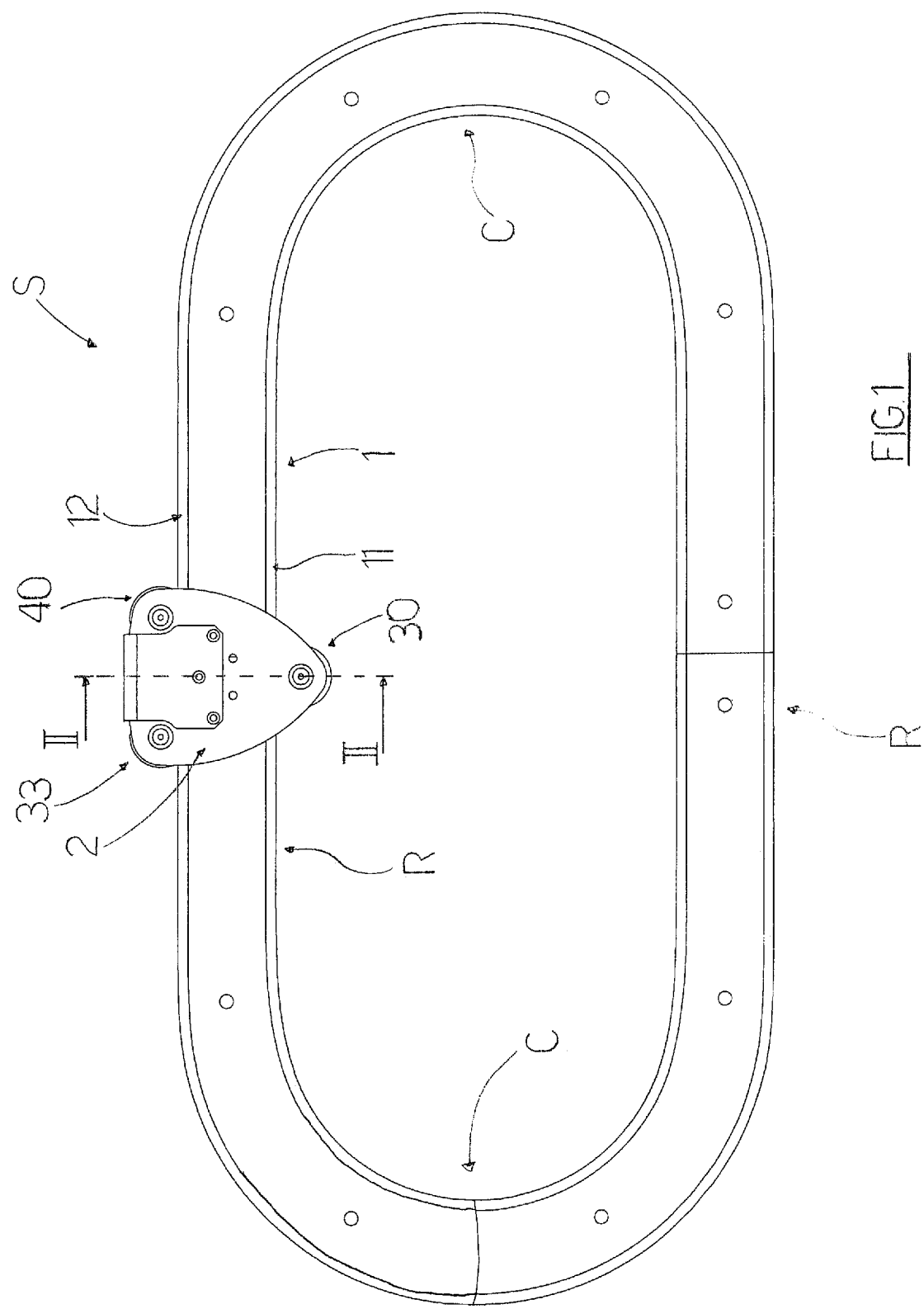
FIG. 1 is a schematic plan view of a possible configuration of the transport system of the present invention in its entirety.

The guide path (1) is conformed such as to comprise a first guide profile (11) and a second guide profile (12) that are arranged parallel to one another and have an extension that is such as to comprise at least a straight portion (R) and at least a curved portion (C), for example loop-closed with straight portions (R) connected by curved portions (C), as shown in FIG. 1.

Figure 2:
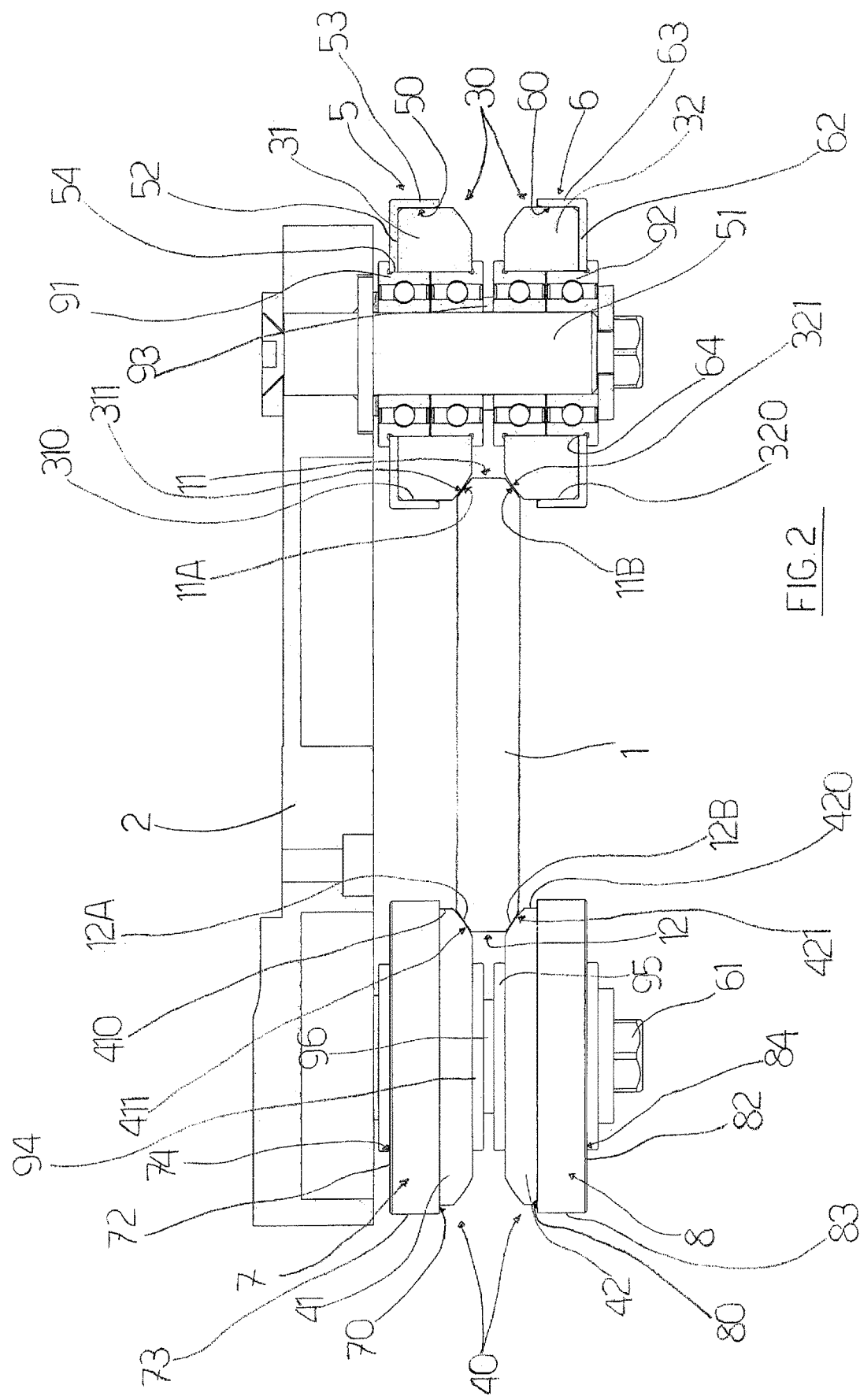
FIG. 2 is a schematic view along section plane II-II of FIG. 1, in a larger scale, so as to evidence particular elements and characteristics of the transport system of the present invention.

The first guide profile (11) is conformed in such a way as to have a first rolling wall (11A) and a second rolling wall (11B), for example arranged inclined to one another, while the second guide profile (12) is conformed in such a way as in turn to have a first rolling wall (12A) and a second rolling wall (12B), for example arranged inclined to one another (see for example FIG. 2).

In order to be moved along the guide path (1), the mobile carriage (2) comprises at least a first pair (30) of rollers (31, 32) and at least a second pair (40) of rollers (41, 42).

The rollers (31, 32) of the first pair (30) of rollers (31, 32) are mounted rotatably on a first rotation shaft (51) borne by the carriage (2), and are made of a plastic material, having a variable hardness according to the application.

The rollers (31, 32) of the at least first pair (30) of rollers (31, 32) have a shape that is such as to have an internal wall (315, 325) for coupling with the first rotation shaft (51) and a lateral external wall having a main portion (310, 320) and a contact portion (311, 321) and are mounted on the first rotation shaft (51) so that a first roller (31) is in contact via the relative contact portion (311) with the first rolling wall (11A) of the first guide profile (11) and so that a second roller (32) is in contact via the relative contact portion (321), with the second rolling wall (11B) of the first guide profile (11) so that when the mobile carriage (2) is moved along the guide path (1), the first roller (31) can roll along the first rolling wall (11A) of the first guide profile (11) and the second roller (32) can roll along the second rolling wall (11B) of the first guide profile (11).

The rollers (41, 42) of second pair (40) of rollers (41, 42) are mounted rotatably on a second rotation shaft (61) borne by the carriage (2), and are made of a plastic material, having a variable hardness according to the application.

The rollers (41, 42) of the second pair (40) of rollers (41, 42) have a shape that is such as to have an internal wall (415, 425) for coupling with the second rotation shaft (61) and a lateral external wall having a main portion (410, 420) and a contact portion (411, 421) and are mounted on the second rotation shaft (61) so that a first roller (41) is in contact via the relative contact portion (411) with the first rolling wall (12A) of the second guide profile (12) and so that a second roller (42) is in contact via the relative contact portion (421), with the second rolling wall (12B) of the second guide profile (12) so that when the mobile carriage (2) is moved along the guide path (1), the first roller (41) can roll along the first rolling wall (12A) of the second guide profile (12) and the second roller (42) can roll along the second rolling wall (12B) of the second guide profile (12).

The peculiarities of the transport system (S) of the present invention consist in the fact that it comprises, for each roller (31, 32) of the first pair (30) of rollers (31, 32) and for each roller (41, 42) of the second pair (40) of rollers (41, 42), a reinforcing element (5,6, 7, 8) which is friction-coupled to at least a part of the main portions (310, 320, 410, 420) of the external lateral walls of the rollers (31, 32, 41, 42) (see in particular figures from 3A to 3D which illustrate any roller (31, 32, 41, 42) of the two pairs of rollers to which a corresponding reinforcing element (5, 6, 7, 8) is friction-coupled.

In practice, the reinforcing element constitutes a sort of jacket or armature that is friction-coupled to the rollers at the at least a part of the main portion of the lateral external wall thereof.

With this detail, a sort of constricting action acts on each roller, i.e. a sort of "strait jacket" which, in the case of overheating of the roller, opposes any dilations and/or deformations of the material with which they are realised, so as to keep the coupling with the relative rotation shaft unaltered, thus preventing the onset of undesired radial and/or axial play and thus also maintaining the precision and contact with the guide profiles.

This detail has been shown to be effective even in a case in which significant angular forces or moments act on the rollers thereof, given by the weight of the transported products.

Each reinforcing element (5, 6, 7, 8) is preferably conformed in such a way as to comprise a relative friction-coupling seating (50, 60, 70, 80) having a shape and dimensions such as to receive in friction-coupling a corresponding roller of the rollers (31, 32, 41, 42) at least at a part of the main portions (310, 320, 410, 420) of the relative external lateral walls of the rollers (31, 32, 41, 42).

In the preferred embodiment illustrated in the figures, each reinforcing element (5, 6, 7, 8) is conformed in such a way as to comprise an abutting base (52, 62, 72, 82) and a first lateral wall (53, 63, 73, 83) having a shape and dimensions such as to define there-between the friction-coupling seating (50, 60, 70, 80), the abutting base (52, 62, 72, 82) which is in contact with and abutment against a head of the roller (31, 32, 41, 42) and the first lateral wall (53, 63, 73, 83) which is in contact with and abutment against a part of the main portion (310, 320, 410, 420) of the external lateral walls of the roller (31, 32, 41, 42) once the reinforcing element (5, 6, 7, 8) is friction-coupled to the roller (31, 32, 41, 42).

The rollers are preferably conformed in such a way that the main portion of the lateral external wall thereof has a cylindrical shape, and consequently the reinforcing elements will be conformed in such a way as to comprise a cylindrical friction-coupling seating, and therefore a cylindrical lateral wall.

Each reinforcing element (5, 6) friction-coupled to the rollers (31, 32) of the first pair of rollers (30) comprises a central axial hole (54, 64) at the relative abutting base (52, 62) to enable passage of the first rotation shaft (51), while, likewise, each reinforcing element (7, 8) friction-coupled to the rollers (41, 42) of the second pair of rollers (41, 42) comprises a central axial hole (74, 84) at the relative abutting base (72, 82) for enabling passage of the second rotation shaft (61).

Figure 3E:
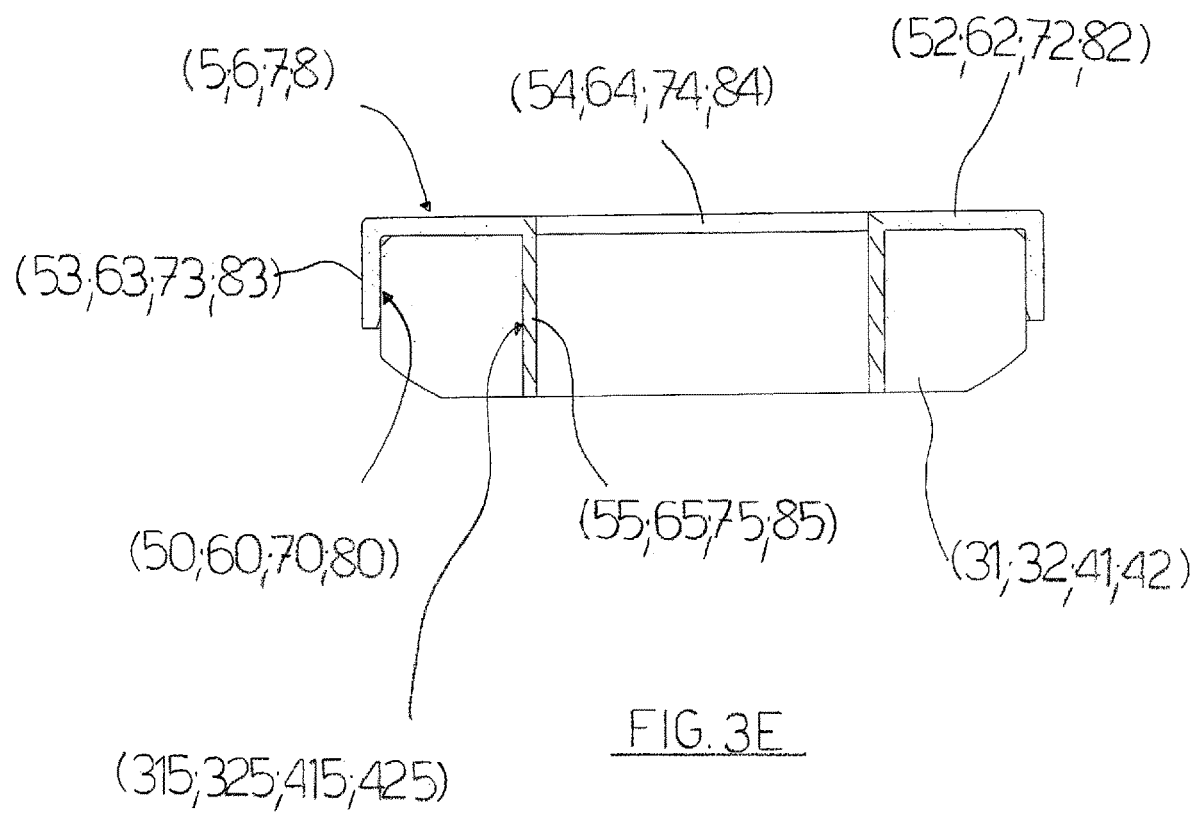
FIG. 3E illustrates, in a transversal section, a possible further preferred embodiment of significant and characteristic elements of the transport system of the present invention.

In a possible preferred embodiment, illustrated in FIG. 3E, each reinforcing element (5, 6, 7, 8) can further comprise a second lateral wall (55, 65, 75, 85), coaxial and delimiting the central axial hole (54, 64), the second lateral wall (55, 65, 75, 85) having such dimensions as to be in contact with and abutment against the internal wall (315, 325, 415, 425) of the roller (31, 32, 41, 42) once the reinforcing element (5, 6, 7, 8) is friction-coupled to the roller (31, 32, 41, 42).

Each reinforcing element (5, 6, 7, 8) is preferably made of metal, preferably stainless steel.

Each reinforcing element (5, 6, 7, 8) is conformed in such a way as to comprise a relative friction-coupling seating (50, 60, 70, 80) so that it is friction-coupled to a corresponding roller (31, 32, 41, 42) of the first pair (30) of rollers (31, 32) and of the second pair (40) of rollers (41, 42) with a friction value comprised between 0.03 and 0.12 mm, preferably comprised between 0.05 and 0.1 mm.

Thus, thanks to the above-described specifications, i.e. the use of a reinforcing element friction-coupled to each of the rollers of the pairs of rollers it is possible to halt a decay of the effectiveness of the coupling with the relative rotation shafts, and thus prevent the onset of undesired axial and/or radial play, including in the presence of prolonged functions, high speeds and/or strong accelerations/decelerations, which can lead to an overheating of the rollers, or in the presence of high stresses acting on the rollers due to the weight of the transported products.

Therefore, the transport system of the present invention effectively obviates the various drawbacks which are encountered in the transport systems of the prior art described in the preamble hereto.

Further advantageous aspects of the transport system (S) of the invention are described in the following.

The rollers (31, 32) of the first pair (30) of rollers (31, 32) are rotatably mounted on the first rotation shaft (51) independently of one another, and wherein the rollers (41, 42) of the second pair (40) of rollers (41, 42) are rotatably mounted on the second rotation shaft (61) independently of one another.

This enables each roller of each of the two pairs of rollers to rotate independently of the other roller and thus enable the carriage to perform curved portions without problems and, as a function of the load of the entity thereof, to rotate with different peripheral velocities, thus preventing dragging with respect to the guide profiles of the guide path.

The rollers of each pair of rollers can thus roll along the two guide profiles of the guide path independent of one another and thus autonomously adjust to the stresses that can act thereon, with a consequent reduction of wear.

The first rotation shaft (51), the second rotation shaft (61) are preferably predisposed and mounted on the mobile carriage (2) so as to be parallel to one another.

As illustrated in figure appended figures, the rollers (31, 32) of the first pair of rollers are preferably rotatably mounted on the first rotation shaft (51) by means of relative bearings (91, 92) and wherein a first spacer member (93) is mounted on the first rotation shaft (51) so as to be interposed between the bearings (91, 92) so as to maintain the rollers (31, 32) reciprocally distanced in relation to the distance between the first rolling wall (11A) and the second rolling wall (11B) of the first guide profile (11);

Correspondingly, the rollers (41, 42) of the second pair of rollers are mounted on the second rotation shaft (61) by means of relative bearings (94, 95) and a second spacer member (96) is mounted on the second rotation shaft (61) so as to be interposed between the bearings (94, 95) so as to maintain the rollers (41, 42) of the second pair (40) of rollers (41, 42) reciprocally distanced in relation to the distance between the first rolling wall (12A) and the second rolling wall (12B) of the second guide profile (12).

The rollers (31, 32) of the first pair (30) of rollers (31, 32) are preferably mounted on the first rotation shaft (51) in such a way that at least one thereof is demountable from the first rotation shaft (51) so as to enable replacement of the first spacer member (93) with a further spacer member having different dimensions.

In the same way, the rollers (41, 42) of the second pair (40) of rollers (41, 42) are mounted on the second rotation shaft (61) in such a way that at least one thereof is demountable from the second rotation shaft (61) so as to enable replacement of the second spacer member (96) with a further spacer member having different dimensions.

The contact portion (311, 321) of the rollers (31, 32) of the first pair (30) of rollers (31, 32) preferably has a truncoconical shape or a spherical cap shape; and wherein the contact portion (411, 421) of the rollers (41, 42) of the second pair (40) of rollers (41, 42) has a truncoconical shape or a spherical cap shape.

The carriage (2) can further comprise other pairs of rollers.

For example, in the illustrate preferred embodiment, the carriage (2) also comprises a third pair (33) of rollers (34, 35) which are mounted rotatably on a third rotation shaft (36) borne by the carriage (2) so that the rollers (34, 35) are in contact with the two rolling walls of the second guide profile (12).

In this case corresponding reinforcing elements (340, 350) will be provided, friction-coupled to the rollers (34, 35) of the third pair of rollers (33) at least at a part of the main portion of the external lateral walls thereof.

The invention claimed is:
1. A transport system for transport of products, comprising:
a guide path and at least a mobile carriage for transport of products movable along the guide path,
wherein the guide path is conformed in such a way as to comprise a first guide profile and a second guide profile;
the first guide profile being conformed in such a way as to have a first rolling wall and a second rolling wall,
the second guide profile being conformed in such a way as in turn to have a first rolling wall and a second rolling wall;

wherein the mobile carriage comprises:
  at least a first pair of rollers being mounted rotatably on a first rotation shaft borne by the carriage, the rollers of the at least the first pair of rollers being made of a plastic material and having a shape that is such as to have an internal wall for coupling with the first rotation shaft and a lateral external wall having a main portion and a contact portion and being mounted on the first rotation shaft so that a first roller is in contact via the relative contact portion with the first rolling wall of the first guide profile and so that a second roller is in contact via the relative contact portion with the second rolling wall of the first guide profile so that when the mobile carriage is moved along the guide path, the first roller can roll along the first rolling wall of the first guide profile and the second roller can roll along the second rolling wall of the first guide profile;
  and at least a second pair of rollers which are mounted rotatably on a second rotation shaft borne by the carriage, the rollers of the at least the second pair of rollers being made of a plastic material and having a shape that is such as to have an internal wall for coupling with the second rotation shaft and a lateral external wall having a main portion and a contact portion and being mounted on the second rotation shaft so that a first roller is in contact via the relative contact portion with the first rolling wall of the second guide profile and so that a second roller is in contact via the relative contact portion with the second rolling wall of the second guide profile so that when the mobile carriage is moved along the guide path, the first roller can roll along the first rolling wall of the second guide profile and the second roller can roll along the second rolling wall of the second guide profile;
  further comprising:
  for each roller of the first pair of rollers and for each roller of the second pair of rollers, a reinforcing element which is friction-coupled to at least a part of the main portions of the external lateral walls of the rollers.

2. The transport system of claim 1, wherein each reinforcing element is conformed in such a way as to comprise a relative friction-coupling seating having a shape and dimensions such as to receive in friction-coupling a corresponding roller of the rollers at least at a part of the main portions of the relative external lateral walls of the rollers.

3. The transport system of claim 2, wherein each reinforcing element is conformed in such a way as to comprise an abutting base and a first lateral wall having a shape and dimensions such as to define there-between the friction-coupling seating, the abutting base which is in contact with and abutment against a head of the roller and the first lateral wall which is in contact with and abutment against a part of the main portion of the roller once the reinforcing element is friction-coupled to the roller.

4. The transport system of claim 3, wherein each reinforcing element friction-coupled to the rollers of the first pair of rollers comprises a central axial hole at the relative abutting base to enable passage of the first rotation shaft and wherein each reinforcing element friction-coupled to the rollers of the second pair of rollers comprises a central axial hole at the relative abutting base for enabling passage of the second rotation shaft.

5. The transport system of claim 4, wherein each reinforcing element further comprises a second lateral wall, coaxial and delimiting the central axial hole, the second lateral wall having such dimensions as to be in contact with and abutment against the internal wall of the roller once the reinforcing element is friction-coupled to the roller.

6. The transport system of claim 1, wherein each reinforcing element is made of metal.

7. The transport system of claim 1, wherein the rollers of the first pair of rollers are rotatably mounted on the first rotation shaft independently of one another, and wherein the rollers of the second pair of rollers are rotatably mounted on the second rotation shaft independently of one another.

8. The transport system of claim 1, wherein the first rotation shaft and the second rotation shaft are predisposed and mounted on the mobile carriage so as to be parallel to one another.

9. The transport system of claim 1, wherein the rollers of the first pair of rollers are rotatably mounted on the first rotation shaft by means of relative bearings and wherein a first spacer member is mounted on the first rotation shaft sous to be interposed between the bearings so as to maintain the rollers reciprocally distanced in relation to the distance between the first rolling wall and the second rolling wall of the first guide profile;
  wherein the rollers of the second pair of rollers are mounted on the second rotation shaft by means of relative bearings and wherein a second spacer member is mounted on the second rotation shaft so as to be interposed between the bearings so as to maintain the rollers of the second pair of rollers reciprocally distanced in relation to the distance between the first rolling wall and the second rolling wall of the second guide profile.

10. The transport system of claim 9 wherein:
  the rollers of the first pair of rollers are mounted on the first rotation shaft in such a way that at least one thereof is demountable from the first rotation shaft so as to enable replacement of the first spacer member with a further spacer member having different dimensions;
  the rollers of the second pair of rollers are mounted on the second rotation shaft in such a way that at least one thereof is demountable from the second rotation shaft so as to enable replacement of the second spacer member with a further spacer member having different dimensions.

11. The transport system of claim 1, wherein: the contact portion of the rollers of the first pair of rollers has a truncoconical shape or a spherical cap shape; and wherein the contact portion of the rollers of the second pair of rollers has a truncoconical shape or a spherical cap shape.

12. The transport system of claim 1 wherein each reinforcing element is made of stainless steel.

* * * * *